Figure 1:
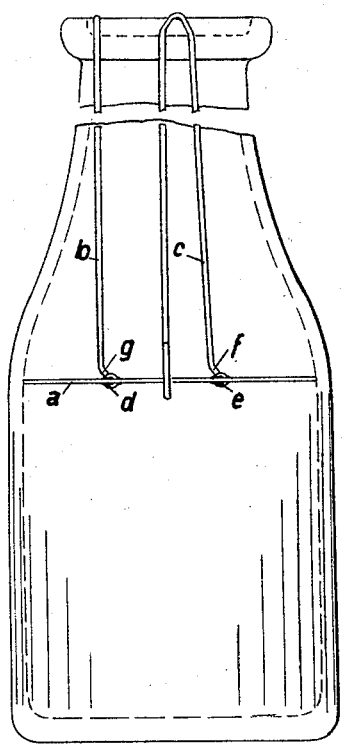
Figure 2:
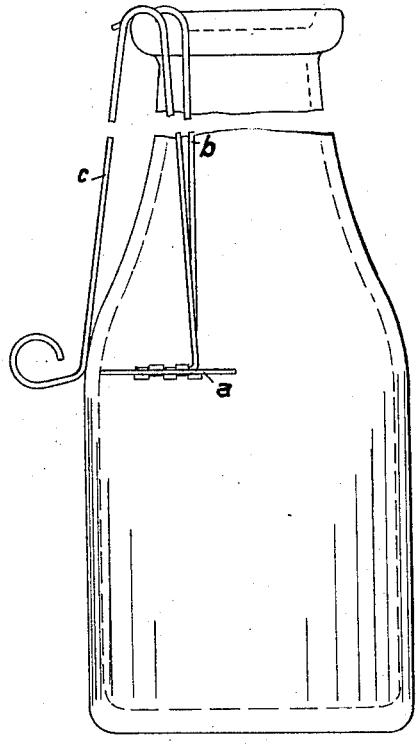
Figure 3:
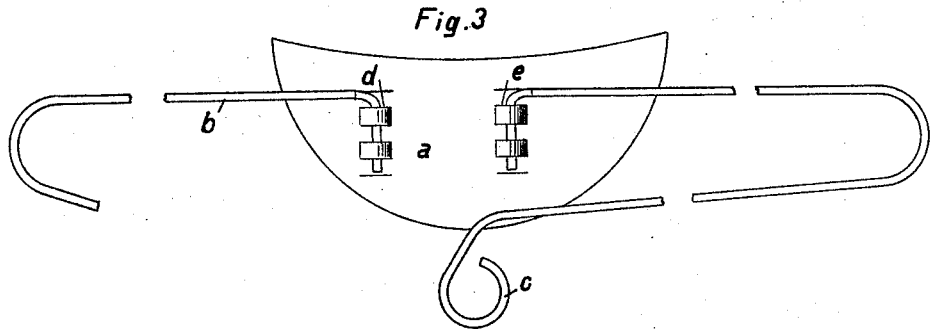

March 14, 1933. A. O. MIDDLEMISS 1,900,993

CREAM SKIMMER

Original Filed April 18, 1929  2 Sheets-Sheet 1

Austin O. Middlemiss
INVENTOR

March 14, 1933.  A. O. MIDDLEMISS  1,900,993
CREAM SKIMMER
Original Filed April 18, 1929   2 Sheets-Sheet 2
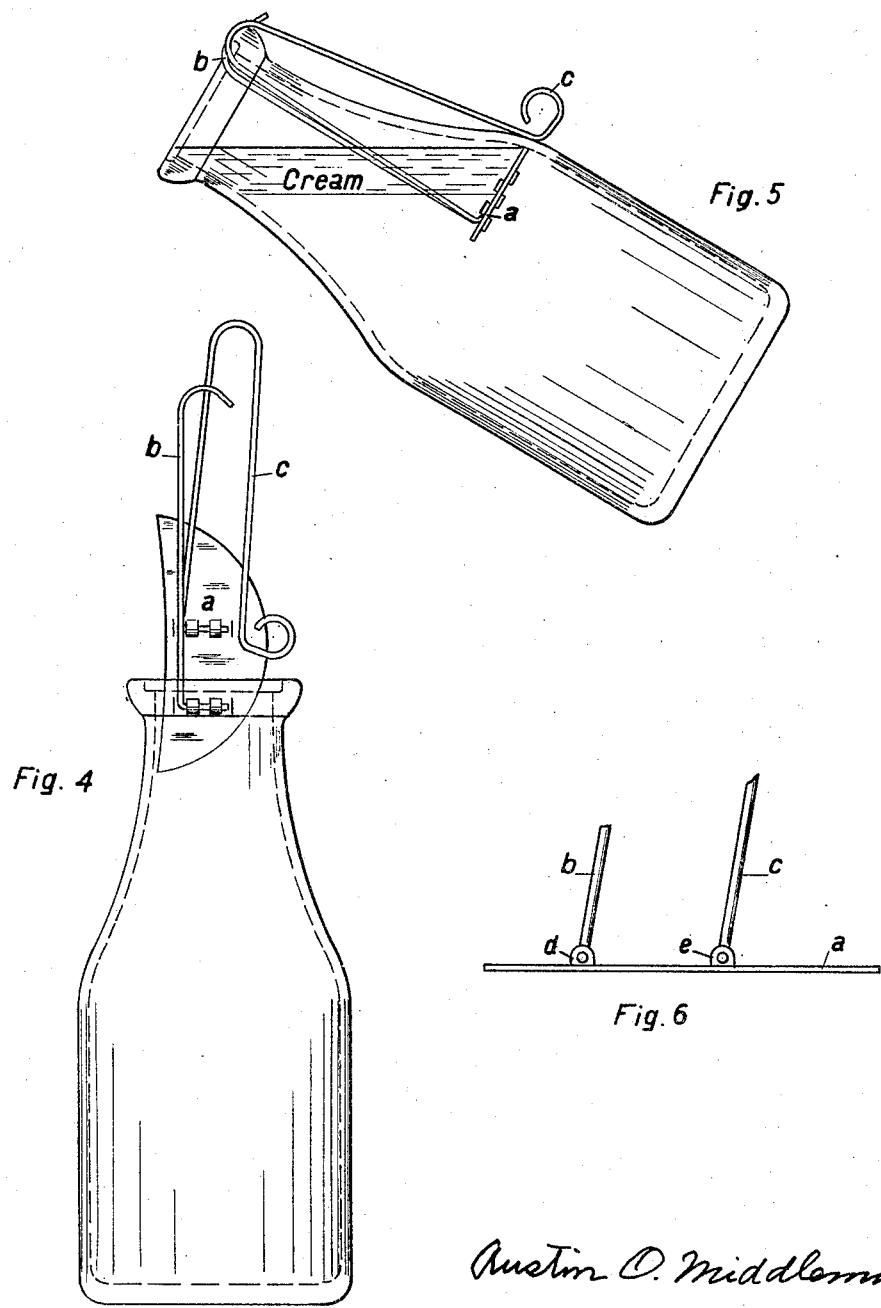
Austin O. Middlemiss
INVENTOR Patented Mar. 14, 1933

1,900,993

UNITED STATES PATENT OFFICE

AUSTIN O. MIDDLEMISS, OF PORTLAND, OREGON

CREAM SKIMMER

Application filed April 18, 1929, Serial No. 356,019. Renewed September 2, 1931.

This invention relates to a device to be used in the separation of the cream from the milk in the ordinary milk bottle. The object of the invention is the production of a device of extreme simplicity that can be quickly and effectively operated and quickly cleaned, also of low first cost. The device accomplishes the above results by interposing a barrier in the milk bottle at the cream line which functions to prevent the cream from running toward the bottom of the bottle as the bottle is inclined; this action is more apparent by a study of the accompanying drawings. It is obvious that this device is used on the top side of the inclined bottle while pouring.

Fig. #1 is an elevation of a milk bottle with the device in position at the cream line.

Fig. #2 is an elevation taken 90 degrees from Fig. #1.

Figure #3 is a plan view of the invention.

Figure #4 shows method of inserting the skimmer in the bottle.

Figure #5 illustrates the relative position of the cream and milk when the bottle is inclined.

Figure #6 shows another method of hinging the wires.

Fig. #3 is a plan view of the invention showing details of construction as follows: (a) is approximately a semicircular plate, preferably slightly crescent shaped. (b) is a placing and restraining member hinged to plate (a) at (d); (c) is a member adapted to restrain and clamp the plate (a) against the wall of the bottle and act as a handle.

By reference to Figure #1, (f) shows an offset in the members (c) and (b) adapting them to take a position parallel to the plane of plate (a). This action will be more clearly understood by reference to Fig. #4, which shows method of inserting the invention into the bottle.

It will be obvious that part (b) will come in contact with the mouth of the bottle and combine with the action of part (c) to place the plate (a) in a horizontal position. It will be also noticed that the hinges (d) and (e) are preferably placed un-symmetrically on plate (a) as these positions give more efficient action and better clamping results as the clamping should be accomplished at a point opposite the plate center of contact with the bottle. If a hinge is used such as illustrated at Fig. #6, the offset bends (f), (g), in members (c) and (b) are unnecessary. I do not wish to be limited to any method of hinging members (b) and (c) as this detail in no way affects the invention.

Having thus clearly described my invention, what I claim is:

1. In a cream skimmer the combination of an elongated skimming plate having one curved edge adapted to fit the inside of a bottle, two handle members of substantially the same length having hooks at one end to engage the bottle, the other ends of said handle members pivoted at spaced points to the elongated member with pivots being substantially parallel and extending transversely of the member.

2. In a cream skimmer, an elongated skimming plate having one curved edge adapted to fit the inside of a bottle, a curved handle member attached to the elongated plate and adapted to contact the top of the bottle at the curved portion and extending downward on the outside of the bottle to a point substantially opposite the elongated plate and springing toward the plate; a placing and restraining member provided with a hook on its upper portion to contact the edge of the bottle and a hinged connection to the elongated skimming plate on the bottom end.

AUSTIN O. MIDDLEMISS.